April 27, 1926.  
F. F. BRUCKER  
1,582,507  
HOLLOW RUBBER ARTICLE  
Original Filed June 19, 1924
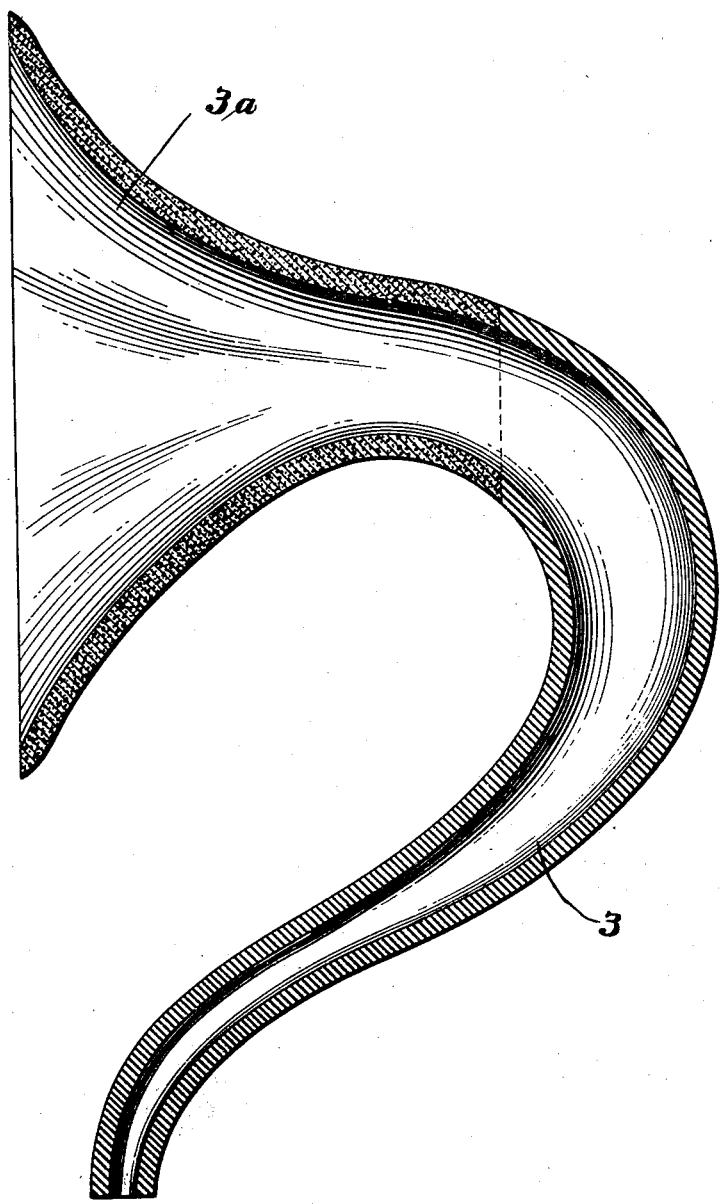
Inventor:  
Ferdinand F. Brucker,  
by Ofner Middleton Donaldson Hall  
Attys.

Patented Apr. 27, 1926.

1,582,507

UNITED STATES PATENT OFFICE.

FERDINAND F. BRUCKER, OF AKRON, OHIO, ASSIGNOR TO THE MILLER RUBBER COMPANY, OF AKRON, OHIO, A CORPORATION OF OHIO.

HOLLOW RUBBER ARTICLE.

Original application filed June 19, 1924, Serial No. 721,092. Divided and this application filed January 6, 1925. Serial No. 914.

*To all whom it may concern:*

Be it known that I, FERDINAND F. BRUCKER, a citizen of the United States, and resident of Akron, in the county of Summit and State of Ohio, have invented certain new and useful Improvements in Hollow Rubber Articles, of which the following is a specification.

My present invention relates to hollow rubber articles, and particularly to sinuous tubular hard rubber articles such as sound conducting horns.

Very successful horns for this purpose have been manufactured from cellular hard rubber. The mold cavities are partially filled with unvulcanized rubber compound suitable for the manufacture of cellular hard rubber, the molds are bolted, and subjected to vulcanizing temperature, preferably in an open steam vulcanizer. During vulcanization the rubber compound expands and completely fills the mold, becoming vulcanized in that condition. It has been found impossible to make certain shapes of horns by this process, as cores were required in the molding process and due to the sinuous nature of these horns, such cores could not be removed therefrom.

One object of this invention is to provide a horn of a sinuous of analogous character which may be made of hard rubber without the use of sinuous cores. In the method described in my application Serial No. 721,092, filed June 19, 1924, of which the present application is a division, a horn in produced having the bell portion composed of cellular hard rubber and the sinuous neck portion of solid hard rubber. The horn is so made that the bell portion is molded over a core, whereas the sinuous portion is blown from solid hard rubber. The invention includes the novel article hereinafter described and defined by the appended claim.

In the accompanying drawing—

The figure shows a horn or amplifier of the radio receiving set type, which is selected as a convenient illustration and embodiment of my invention.

The horn or amplifier shown in this drawing comprises a neck portion 3 of solid hard rubber composition, and a mouth or flaring portion 3ª of hard cellular rubber, that is, hard rubber which has distributed throughout the interior thereof a multiplicity of relatively small cells.

The two portions are homogeneously joined together end to end by vulcanization at the point indicated by the dotted line, so as to form a unitary article.

Having thus described my invention, what I claim is :—

A horn or amplifier having a bell portion of cellular hard rubber and a neck portion of solid hard rubber integrally united thereto.

In testimony whereof, I affix my signature.

FERDINAND F. BRUCKER.